(12) United States Patent
Mitzkus et al.

(10) Patent No.: US 6,717,724 B2
(45) Date of Patent: Apr. 6, 2004

(54) MICROSCOPE SUPPORT

(75) Inventors: Reiner Mitzkus, Goettingen (DE); Martin Schultheiss, Schwaebisch Gmuend (DE); Heinrich Henssler, Schwaebisch Gmuend (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/253,065

(22) Filed: Sep. 24, 2002

(65) Prior Publication Data
US 2003/0103264 A1 Jun. 5, 2003

(30) Foreign Application Priority Data
Sep. 28, 2001 (DE) .......................... 101 48 781

(51) Int. Cl.$^7$ .............................................. G02B 21/00
(52) U.S. Cl. ................... 359/368; 248/346.06
(58) Field of Search ................. 359/368, 391; 248/118, 118.3, 346.01, 346.03, 346.05, 346.06

(56) References Cited

U.S. PATENT DOCUMENTS

| 2,604,815 A | 7/1952 | Engelmann |
| 2,730,923 A | 1/1956 | Gorham et al. |
| 5,195,705 A | 3/1993 | Kline et al. |
| 5,517,354 A | 5/1996 | Mika |
| 2002/0176159 A1 * | 11/2002 | Konopa ..................... 359/368 |

* cited by examiner

Primary Examiner—Mark A. Robinson
(74) Attorney, Agent, or Firm—Reed Smith LLP

(57) ABSTRACT

The invention is directed to a microscope support by means of which the microscope can be moved into an ergonomic position for the user. A base plate with adjustable inclination serves at the same time as an arm support. A support plate for the microscope whose height and inclination can likewise be adjusted is articulated at the arm support.

8 Claims, 2 Drawing Sheets

MICROSCOPE SUPPORT

CROSS-REFERENCE TO RELATED APPLICATIONS

This application claims priority of German Application No. 101 48 781.9, filed Sep. 28, 2001, the complete disclosure of which is hereby incorporated by reference.

BACKGROUND OF THE INVENTION a) Field of the Invention

The invention is directed to a microscope support by means of which the microscope can be moved into an ergonomic position for the user.

b) Description of the Related Art

Microscopes are used in many work places in industry, in research facilities and in the health industry. Users are often compelled to work at the microscope in a given position over long periods of time. This often leads to problems such as pain in the back, shoulders or arms. These problems were recognized by microscope manufacturers and solutions were developed, for example, to adjust the height of the oculars or to arrange the operating controls within easy reach. However, adjustment of the height of for looking into the oculars requires considerable expenditure on the design of the optical system and is accordingly reserved for high-priced microscopes due to cost.

Also, microscopes are only manufactured in standard sizes and therefore can not be adapted in a flexible manner to the needs of the user.

In order to afford the user the possibility of adapting to his or her preferred posture at the microscope, it was already suggested early on to position the microscope on a support or base which makes the position of the microscope adaptable to the physical requirements of the user through height adjustment and inclination.

In U.S. Pat. No. 2,604,815, dating from 1952, the microscope itself has three legs, one of which can be folded down, so that only the inclination of the microscope is adjustable. Further, this solution is relatively unstable and is no longer usable for modern microscopes because of their weight.

A similar solution is described in U.S. Pat. No. 2,730,923. In this case, the microscope is tiltable about a shaft in the front portion facing the user and has, in its rear portion, a support that can lock into a frame in defined positions to achieve different inclinations. This solution has the same disadvantages as U.S. Pat. No. 2,604,815.

For a more sensitive adjustment of inclination, it was suggested in U.S. Pat. No. 5,517,354 to provide threaded bolts in the rear portion of the microscope support instead of catches so as to regulate the height and, therefore, the inclination in a continuous manner. This results in a convenient solution for adjusting inclination; however, in this solution, as in those mentioned above, the adjustment of inclination also changes the height and, therefore, the accessibility of the controls of the microscope. This leads to a lack of comfort for the user because the user can no longer operate the microscope while resting his or her forearms in the accustomed manner. In order to overcome this disadvantage, it was suggested in U.S. Pat. No. 5,195,705 that, in addition to a tilt adjustment of the microscope which is again implemented by catches, wedge-shaped arm supports are positioned next to the microscope in order to adapt the gripping height of the hands to the position of the controls at the tilted microscope. However, the height of these arm supports can not be varied. Further, because of their low weight (it is suggested that they be made of foamed material), they can easily be moved out of their optimal position by the user and must then be adjusted again.

Another disadvantage in these known solutions consists in that the viewing height for looking into the oculars changes with the tilt of the microscope, which can again lead to an uncomfortable posture for the user. Further, it may not be possible to achieve greater inclinations of the microscope which are desired for ergonomic reasons due to the intended microscope method, e.g., when using microscopes to examine preparations in petri dishes or the like.

OBJECT AND SUMMARY OF THE INVENTION

It is the primary object of the invention to overcome the disadvantages in the prior art described above and to provide a microscope support which allows the change in the inclination and eye height of the microscope to be adapted to the needs of the user in a simple manner.

This object is met according to the invention by a microscope support for holding an optical microscope in an adjustable manner, comprising an essentially plate-shaped base body which has adjusting elements in its rear area for adjusting the inclination of the base body. The plate-shaped base body preferably has a cutout in the center for receiving a second plate-shaped part which is provided for attachment of the microscope. The second plate-shaped part is articulated in its rear area at the base body. Adjusting elements are provided in the front area of the second plate-shaped part for adjusting the inclination of the second plate-shaped part.

The special advantage of the invention consists in that the inclination of the microscope as well as the eye height of the ocular can be adapted to the demands of the user in a very simple manner. Further, it is ensured that the user can rest his or her forearms in the accustomed manner so as to reach the controls of the microscope in a relaxed posture.

The invention will be described more fully in the following with reference to a preferred embodiment example.

BRIEF DESCRIPTION OF THE INVENTION

DESCRIPTION OF THE PREFERRED EMBODIMENTS

Figure 1:
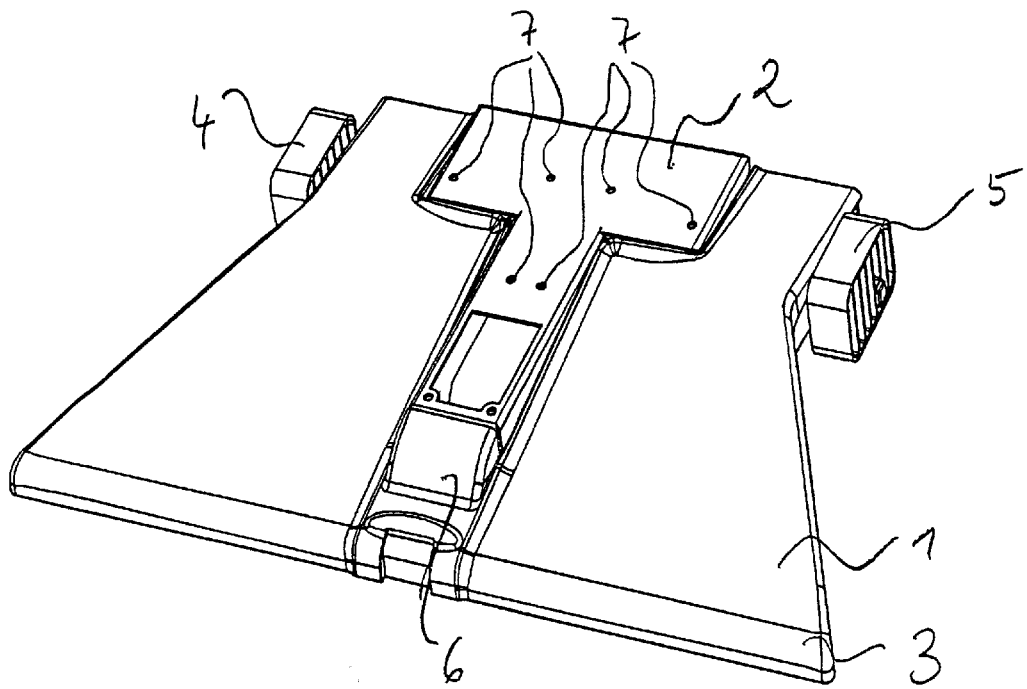
FIG. 1 shows an overview of the microscope support according to the invention.

In FIG. 1, the base plate 1 which in this case is formed of two parts has a cutout for the second plate 2. The base plate 1 has a rounded edge 3 in the front area for enhanced ergonomics and is supported at the front side on a table or the like, not shown. Adjustable feet 4, 5 are arranged in the rear area of the base plate 1. The second plate 2 is articulated at the base plate 1 in its rear area by means of a pin, not visible here. In its front area, the second plate 2 has a catch mechanism 6 for adjusting the height and accordingly the inclination of the plate 2 relative to plate 1. Plate 2 has connection elements 7 for fastening a microscope. The plate 1 is advantageously coated with a soft fabric, plastic or soft touch paint to provide a comfortable support for the forearms of the user.

Figure 2:
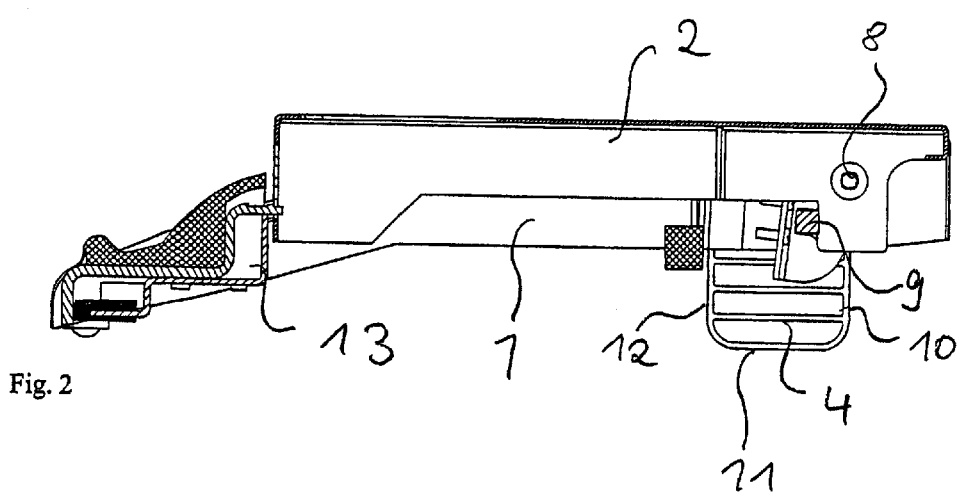
FIG. 2 shows a cross section (microscope support in maximum position)

FIG. 2 shows a schematic view of a cross section through the microscope support according to the invention along the center of the second plate 2. The plate 2 is tiltable relative to plate 1 by means of the pin 8. The adjustable foot 4 is shaped essentially as a right parallelepiped. It is connected to the base plate 1 by the swivel pin 9 which is arranged at different distances from the respective side surfaces (10, 11, 12). Accordingly, the base plate 1 has different inclinations depending on the side surface of the right parallelepiped that is selected for support on the table. The height of the microscope fastened to the plate 2 is also changed at the same time. The height of the plate 2 is adjusted at the front by a catch mechanism 13. In the view shown in FIG. 2, the plate 2 and accordingly the microscope (not shown) fastened to it is shown in the highest position.

Figure 3:
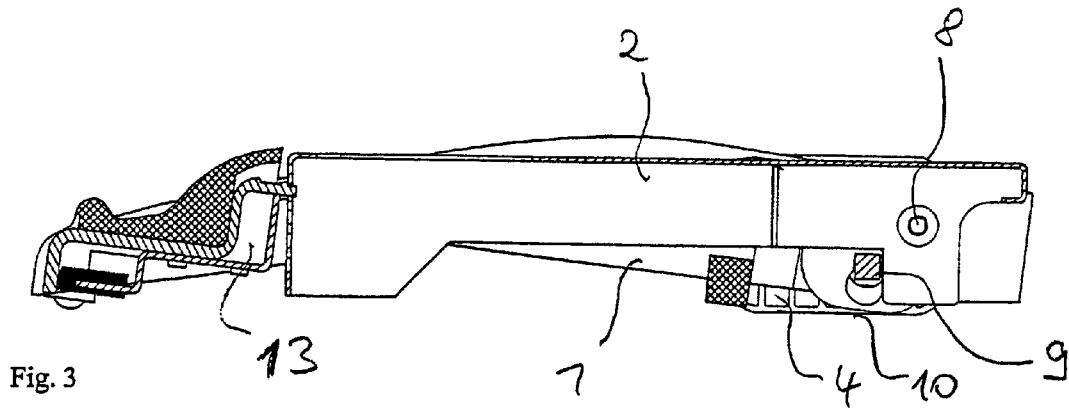
FIG. 3 shows a cross section (microscope support in minimum position)

FIG. 3 shows the same schematic cross section as in FIG. 2 to illustrate the principle of the invention, but in this case in the lowest position for the microscope. The foot 4 is rotated in such a way that the side surface 10 at the shortest distance from the swivel pin 9 is supported on the table and the catch mechanism 13 is locked into the lowest position for the plate 2.

Figure 4:
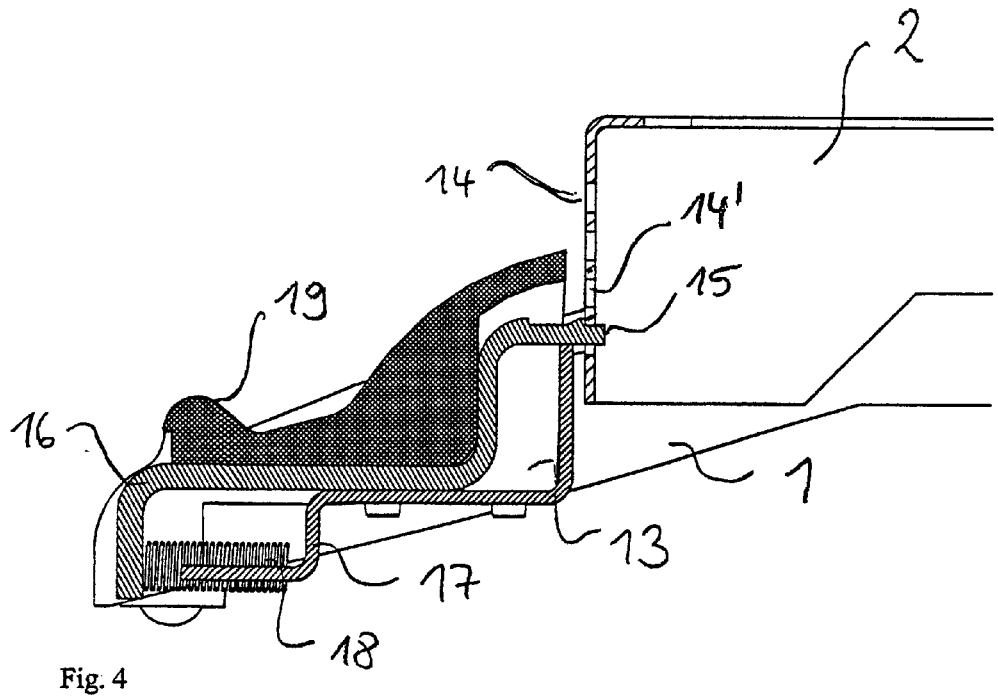
FIG. 4 is a detailed view of the catch mechanism.

FIG. 4 shows the catch mechanism 13 for the height adjustment of the front part of the plate 2 in an enlarged view for purposes of illustration. The plate 2 has cutouts 14 at its front surface in which a complementary piece 15 engages. The complementary piece 15 is a component part of a slide 16 which is mounted so as to be displaceable on a mounting plate 17 that is fixedly connected to the base plate 1. The position of the slide 16 and mounting plate 17 is fixed by a spring 18. A hand rest 19 which is shaped in an ergonomic manner and which serves at the same time as a handle is arranged on the slide 16. In order to adjust the height of the front part of the plate 2, and accordingly the inclination of the microscope (not shown here) which is fastened to the plate 2, the catch mechanism 13 is relieved by lifting the microscope slightly and the complementary piece 15 is drawn out of the cutout 14 against the action of the spring 18 by means of the handle 19. The microscope is accordingly freely tiltable about the pin 8. The desired inclination and height are now adjusted and the complementary piece 15 is moved into the associated cutout 14' by releasing the handle 19.

By means of the invention, the height for looking into the ocular can be adapted individually to the needs of the user even in simple microscopes. At the same time, the controls remain within easy reach because the forearms of the user are guided in such a way by means of the inclination of the base plate that the position of the hands relative to the controls of the microscope remains extensively the same.

The implementation of the invention is not limited to the embodiment examples shown herein. The person skilled in the art will be familiar with other means for height adjustment such as screw drives or the like without departing from the framework of the invention.

While the foregoing description and drawings represent the present invention, it will be obvious to those skilled in the art that various changes may be made therein without departing from the true spirit and scope of the present invention.

What is claimed is:

1. A microscope support for holding an optical microscope in an adjustable manner, comprising:

an essentially plate-shaped base body which has adjusting elements in its rear area for adjusting the inclination of the base body;

said plate-shaped base body having a cutout in the center for receiving a second plate-shaped part which is provided for attachment of the microscope;

said second plate-shaped part being articulated in its rear area at the base body; and adjusting elements being provided in the front area of the second plate-shaped part for adjusting the inclination of the second plate-shaped part.

2. The microscope support according to claim 1, wherein the second plate-shaped part is supported in its front area against the base body and the inclination of the second part is adjustable relative to the base body.

3. The microscope support according to claim 2, wherein a catch mechanism with a plurality of catch positions at different heights is provided in the front area of the second plate-shaped part, and wherein a catch element connected to the base plate can be engaged in the catch mechanism.

4. The microscope support according to claim 1, wherein the second plate-shaped part is supported in its front part against an adjusting surface for the microscope support, and the inclination of the second part relative to the adjusting surface is adjustable.

5. The microscope support according to claim 1, wherein a vertically adjustable foot is provided in each of the two rear corners of the base plate.

6. The microscope support according to claim 5, wherein each of the vertically adjustable feet is shaped essentially as a right parallelepiped and is rotatable about a pin which penetrates the right parallelepiped eccentrically, wherein the pin is connected to the base body, and wherein the pin is at different distances from the four side surfaces of the right parallelepiped.

7. The microscope support according to claim 1, wherein the base plate has rounded edges in the front area.

8. The microscope support according to claim 1, wherein the second plate-shaped part has fastening means for the optical microscope.

* * * * *